Patented May 27, 1947

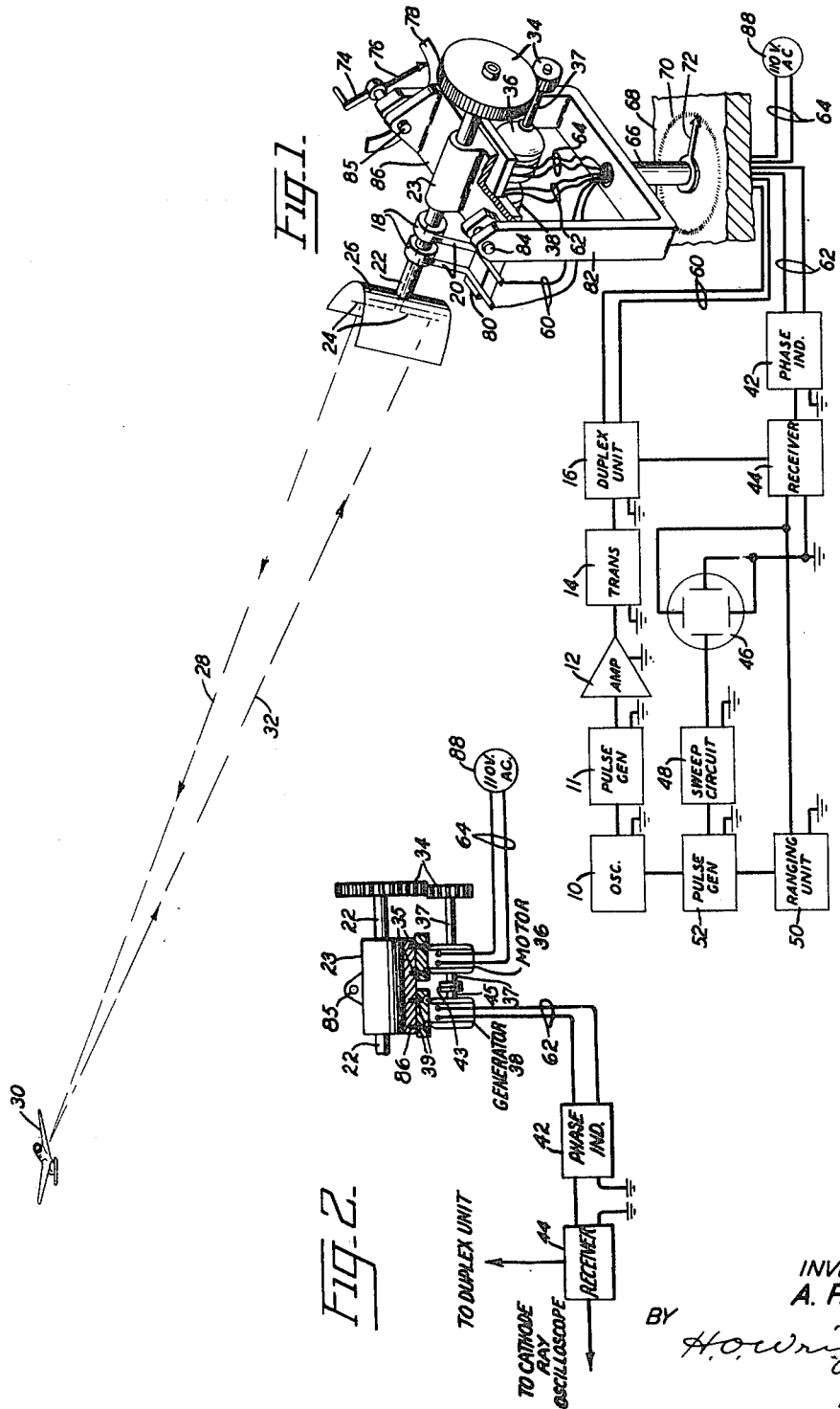

2,421,028

UNITED STATES PATENT OFFICE 2,421,028

WAVE REFLECTION AIRCRAFT DETECTOR USING ROTATING POLARIZATION

Archie P. King, Red Bank, N. J., assignor to Bell Telephone Laboratories, Incorporated, New York, N. Y., a corporation of New York Application November 24, 1942, Serial No. 466,725

4 Claims. (Cl. 250—1.60)

This invention relates to improved radio wave-reflection aircraft detection systems and more particularly to such systems in which the plane of polarization of the exploratory wave is rotated.

Numerous aircraft radio detection systems are well known in the art which transmit a plane polarized radio wave beam from an observation point and scan an area so that the beam will impinge upon aircraft within the area. Reflections of the beam are received at the observation point to obtain indications of the presence and location of aircraft with respect to the observation point.

An outstanding difficulty encountered in such systems is a "fading" in and out of the reflected waves as the aircraft changes its angular relations with respect to the observation point. This seriously hampers the operators of such systems in efforts to detect, follow and make accurate position determinations with respect to the aircraft since the reflected signals are constantly varying in an erratic manner over a large range of amplitude and, if of small maximum amplitude, are frequently being lost completely. Furthermore aircraft at substantial distances from the observation point are likely to provide only occasional spurts or glints of reflected wave when a plane polarized exploratory wave is employed in the usual manner and may never even be detected in normal scanning operations covering the general area in which they are located.

Applicant has discovered that by rotating the plane of such a plane polarized wave, employed in aircraft radio detection systems he can obtain a relatively strong reflection each time the plane of polarization reaches a particular optimum angle with respect to the aircraft, the particular optimum angle changing as the aircraft changes its angular relations with respect to the observation point. By using a relatively rapid rate of rotation frequent maxima or glints, regularly recurring, (usually twice per revolution) are received which substantially eliminate the difficulties above described in detecting, following and locating aircraft.

The principal objects of this invention are, therefore, to eliminate difficulties in detecting, following and locating aircraft with aircraft radio detection systems and to increase the ease and accuracy with which such systems may be employed.

Another object is to provide novel means for obtaining indications of distance from an observing station to certain classes of reflecting objects.

A further object is to provide means for detecting changes in the angular relation of aircraft with respect to a fixed observation point.

Other objects will become apparent during the course of the following description and from the appended claims.

Systems of the invention, and the principles thereof, will be more readily understood from the illustrative preferred embodiment described hereinunder and shown in the accompanying drawing in which Fig. 1 represents, in block schematic diagram form, a system embodying the principles of the invention; and Fig. 2 shows in greater detail the mechanical and electrical connections of the phase reference voltage generator 38 to its associated units of the system of Fig. 1.

In more detail in Fig. 1, oscillator 10 provides a sine wave of such frequency that a single cycle thereof is completed within a time interval slightly exceeding the time required for a radio wave to travel twice the distance to an object at the maximum range of the system. For systems of this general type oscillator 10 will normally provide a frequency of from about 2 to 4 kilocycles.

A portion of the output of oscillator 10 is delivered to pulse generator 11, which may be of the type employing a non-linear reactance such as is described in United States Patent 2,117,752, issued May 17, 1938, to L. R. Wrathall or of any of several electronic tube circuit arrangements well known to those skilled in the art. Pulse generator 11 preferably provides a single substantially squared-top positive pulse for each cycle of oscillator 10, the pulses being from one half to several microseconds in duration. An alternative form of pulse generating circuit is described in detail in the pending application of W. Shockley, Serial No. 460,328, filed October 1, 1942.

Amplifier 12 amplifies the pulses of generator 11 and the amplified pulses are employed to modulate, or key, transmitter 14 the output of which passes through duplexing unit 16, flexible leads 60, brushes 20, slip rings 18, to dipole antenna 24 causing it to emit like sharp pulses of radio wave energy 28. Dipole antenna 24 is provided with a reflector 26 which is preferably cylindrical with parabolic cross section, dipole antenna 24 lying along the focal line of the reflector. The antenna 24 and reflector 26 are mechanically secured to rotatable shaft 22, which is driven through gears 34 by motor 36, to rotate in a bearing 23 of bearing block 86. Bearing block 86 will normally be supported in a mounting such as that comprising yoke 82 mounted on a vertical rotatable shaft 66, pins 84 and 85 supporting block 86 so as to permit rotation about a horizontal axis. A substantial area or solid angle in space may thus be readily scanned by the beam of the system. Motor 36 and a generator 38, are shown more clearly in Fig. 2, to be described presently, and are conveniently mounted on the underside of block 86, by screws 35 and 39, respectively, flexible leads 62 and 64 facilitating electrical connections to the generator and motor, from phase indicator 42 and the source of electrical power 88, respectively. Shaft 66 turns in a bearing on base member 68 which carries an azimuth angle scale 70, shaft 66 being equipped with a pointer 72 affixed thereto so as to facilitate reading the azimuth angle at which the antenna is instantly directed. Similarly, pin 85 may carry a handle 74 to facilitate turning block 86 and a pointer 76 cooperating with a scale 78 affixed to yoke 82 to show the instant vertical angle at which the antenna is directed. Motor 36 may be driven by a convenient source of power such as 88. Brushes 20 are carried by insulating block 80 which is also affixed to the underside of block 86.

With the type of antenna system described above, the wave will be polarized in the plane of the dipole members and the polarization of the emitted wave will consequently rotate with rotation of the antenna system. Alternative antenna arrangements capable of producing a wave in which the plane of polarization continuously rotates will be described hereinunder.

When radio wave pulses 28 impinge upon an aircraft 30, a portion thereof 32, will be reflected back to antenna 24 and through the slip rings 18 and duplexing unit 16 will reach receiver 44. The duplexing unit 16 isolates the receiver from the transmitter during the emission of pulses, and the transmitter from the antenna circuit during the receipt of reflections thereof and may be of any of the several forms well known to those skilled in the art. In a common form it can be proportioned with respect to wave-length and interconnected between the antenna, the transmitter and the receiver so as to impart desired operating impedance properties to the transmitting and receiving branches of the circuit, respectively, a protective voltage limiting device such as a gas-filled tube having a suitable low breakdown voltage commonly being connected in shunt across the receiver input circuit to prevent injurious amounts of power from reaching the receiver.

The received reflected pulses are detected and amplified in receiver 44 and impressed upon the vertical deflecting plates of cathode ray oscilloscope 46.

A second portion of the output of oscillator 10 is supplied to pulse generator 52 which can be similar to generator 11. The pulses from pulse generator 52 are supplied to ranging unit 50 which provides an accurately adjustable time delay circuit for providing pulses for use in timing the received reflected pulses.

Preferred forms of ranging units are described in detail in pending applications of D. Pollock, Serial No. 409,600 filed September 5, 1941, and S. C. Hight, Serial No. 462,525 filed October 19, 1942. The delayed pulses provided by ranging unit 50 are also impressed upon the vertical deflecting plates of the cathode ray oscilloscope 46, and when the ranging unit 50 is adjusted to bring the timing pulses into synchronism with a particular reflected pulse the adjustment of unit 50 is a measure of the reflection time or distance to the aircraft from which the particular reflection is received.

Energy pulses from generator 52 are also provided to sweep circuit 48 which is connected to the horizontal deflecting plates of cathode ray oscilloscope 46 and provides a saw-tooth wave proportioned to sweep the beam of the oscilloscope across the target at a uniform rate such that its extreme position will correspond to the maximum range of the system and intermediate points will proportionately correspond to intermediate portions of the total range.

Except for the rotation of the antenna and its reflector the details so far described are representative of a type of pulse-reflection object detection system now well known to those skilled in the art.

The antenna should be rotated at a rate such that the maximum reflections resulting from the optimum angle of the polarization plane will recur with sufficient frequency to provide indications which will appear to be substantially constant. By employing a cathode ray oscilloscope having a screen of relatively great retentivity a rotation rate readily attainable without substantial mechanical difficulties will be found to be entirely satisfactory. For example a rate of from 100 to 200 revolutions per minute will be ample to provide satisfactory indications under the majority of circumstances. Alternatively a "paraboloidal bowl" type of non-rotatable reflector could be employed with a rotatable dipole antenna mounted near its focal point. This construction would be preferable at longer wave-lengths where the inertia of the reflector would be very large.

The regular rotation of the polarization of the exploring wave results in a similar regular amplitude modulation of the reflections from targets such as aircraft, ship funnels, steel towers and the like which have a well-defined optimum polarization plane for producing reflections. This is apparent since the amplitude of the reflections will be a maximum when the plane of polarization is at the optimum angle, a minimum when the plane of polarization is at 90 degrees from the optimum position and will vary regularly between the maximum and minimum values as the plane of polarization rotates regularly. The frequency of this amplitude modulation will clearly be twice the frequency of rotation since in a complete rotation of the plane of polarization the amplitude will pass twice through its maximum and minimum values and the intermediate values therebetween. For the assumed rate of rotation of the antenna of 200 revolutions per minute the frequency of this amplitude modulation will then be 400 cycles per minute. This is, of course, a very low frequency and can therefore be readily separated in the receiver from the video frequency energy employed in radio reflection object locating systems to deflect the ray of the cathode ray oscilloscope to obtain range indications as described above.

As applied to systems for detecting aircraft this phenomenon can be employed to provide indications of changes in the angular relation of the aircraft with respect to the point of observation in the following manner.

Referring to the drawing, and particularly to Fig. 2, thereof, motor 36 which provides power for the rotation of the antenna system, through gears 34, is also arranged to drive generator 38, the shaft 45 of the latter being connected to the left end of the shaft 37 of motor 36 by coupling 43 as shown in Fig. 2. Generator 38 is designed to provide an alternating current electromotive force having the same frequency as the regular amplitude modulation of the reflected wave received from an object such as an airplane, steel tower or the like, the amplitude modulation resulting from the rotation of the polarization of the exploratory wave, as described above. For example, assuming the antenna of Fig. 1 is being rotated at 200 revolutions per minute, then, as explained above, the frequency of the amplitude modulation will be 400 cycles per minute and if generator 38 is a simple bipolar machine the frequency of the voltage generated by it will be the same as its speed of rotation and in the assumed case it should therefore be rotated at 400 revolutions per minute. Since it is directly coupled to motor 36 the latter should rotate at 400 revolutions per minute and gears 34 should provide a 2 to 1 ratio between the motor rotation speed and that of shaft 22 carrying the antenna system. The output voltage of generator 38 can then be employed as a reference source of fixed phase. Receiver 44, shown in Figs. 1 and 2, demodulates the received reflected waves and obtains, in addition to the video frequency energy furnished to the cathode ray oscilloscope 46, a current having the frequency and phase of the amplitude modulation of these reflected waves. This current is furnished to the phase indicator 42 which is then employed to provide an indication of the phase relation between the amplitude modulation and the reference alternating current of generator 38, phase indicator 42 being connected to the latter through flexible leads 62. As the angular relation of the aircraft with respect to the observation point changes this phase relation will change.

Indications of this character will be of value in anti-aircraft defense since, for example, at the point at which dive bombers start to dive they are most vulnerable to anti-aircraft fire. Such indications will also be of value in determining when high level bombers are starting a "run" at the target just prior to releasing bombs, and for numerous similar purposes.

Moreover, where the reflecting object is of such character that its optimum polarization plane for reflection remains substantially fixed i. e., steel towers, land power lines, and the like, the phase difference between the amplitude modulations and the reference current can be employed to provide distance indications, since the phase relation between the amplitude modulation of the reflected waves and the reference generator will then vary regularly as the distance from the reflecting object changes, and the method, therefore, can be employed to provide light and simple radio systems for use on mobile craft to obtain distance indications with respect to known fixed landmarks such as radio towers, water tanks, and the like. Observations for distance determinations with such systems employed on aircraft should obviously be made only when the aircraft is flying in a horizontal plane. Conversely sudden changes in the phase relation with respect to reflections from a fixed object will provide indications to the pilot that his craft has suddenly changed its angular relation with respect to the earth's surface. The amount of such changes will of course be related to the extent of the angular change. Such indications may obviously be of value in flying blind. Such systems can be substantially as indicated in the schematic diagram of the drawing but the circuit including oscilloscope 46, sweep circuit 48, ranging unit 50, and pulse generator 52 can be omitted unless a means of checking the distance determinations is desired.

To produce an exploratory beam having a rotating polarization numerous other arrangements known in the art can be employed. By way of example, a wave guide horn of circular symmetry about the axis of its beam can be energized by a wave the polarization of which is rotating, or two dipoles positioned in quadrature about a common center point can be energized by two equal components of the transmitter energy which are in quadrature phase relation.

Of course, the duplexing unit 16 of the system shown in the drawing could be dispensed with if a separate receiving antenna system rotated in synchronism with the transmitting antenna system is provided and numerous other modifications and arrangements will readily occur to those skilled in the art within the spirit and scope of the invention.

The scope of the invention is defined in the following claims.

What is claimed is:

1. In a radio wave reflection aircraft detection system, an antenna system adapted to transmit and receive plane polarized waves, said antenna system being mounted on a rotatable shaft the axis of said shaft being coincident with the normal axis of radiation from said antenna system, a motor mechanically coupled to continuously rotate said shaft, a reference wave generator mechanically coupled to be driven by said motor, a radio transmitter, a radio receiver, a duplexing unit coupling said antenna system with said transmitter and said receiver and a phase indicator operatively connected with said generator and said receiver to provide indications of the phase relation of amplitude modulation of received reflected wave energy with respect to the reference generator wave.

2. In the art of detecting and following aircraft by reflected radio waves the method of determining when air craft under observation make changes in course which comprises projecting a plane polarized wave to impinge upon said aircraft, continuously rotating the polarization plane of said wave, receiving reflections of said wave from said aircraft, detecting the amplitude modulation of said reflected waves resulting from said rotation and reflection, generating a local wave of like frequency with said modulation and of fixed phase, and comparing the phase relation between said modulation and said locally generated wave whereby changes in said phase relation provide indications of changes in the course of said aircraft.

3. In the art of distance determination by reflected radio waves the method of determining at a remote observation point the distance to reflecting objects, which comprises projecting a plane polarized wave from said observation point to impinge upon said objects, continuously rotating the plane of polarization of said wave, receiving reflections of said wave at said observation point from said objects, demodulating said received reflections of said wave to obtain the amplitude modulation thereof resulting from said rotation and reflection, generating a local wave of like frequency with said modulation and of fixed phase, and comparing the phase of said modulation with that of said local wave to obtain indications of the distance from said observation point to said reflecting objects.

4. In a system for detecting aircraft by reflected radio waves, of the type in which a wave is transmitted from an observation point to impinge upon the aircraft and reflections of said wave from the aircraft are received at said observation point and utilized to obtain indications of the presence, position and changes in the course of said aircraft, means for rotating the plane of polarization of said transmitted wave, means for detecting the amplitude modulation of said wave resulting from said rotation and reflection and means for determining the phase of said modulation.

ARCHIE P. KING.

REFERENCES CITED

The following references are of record in the file of this patent:

UNITED STATES PATENTS

| Number | Name | Date |
| --- | --- | --- |
| 2,198,113 | Holmes | Apr. 23, 1940 |
| 1,915,784 | Hammond, Jr. | June 27, 1933 |
| 1,993,326 | Hart | Mar. 5, 1935 |
| 2,227,598 | Lyman et al. | Jan. 7, 1941 |
| 1,828,705 | Kolster | Oct. 20, 1931 |
| 2,189,549 | Hershberger | Feb. 6, 1940 |
| 2,272,839 | Hammond | Feb. 10, 1942 |